(12) United States Patent
Raghavan et al.

(10) Patent No.: US 9,830,255 B2
(45) Date of Patent: Nov. 28, 2017

(54) SYSTEM AND METHOD FOR OPTIMIZING TEST SUITE COMPRISING PLURALITY OF TEST CASES

(71) Applicant: Wipro Limited, Bangalore (IN)

(72) Inventors: Girish Raghavan, Chennai (IN); Fathima Jahaara, Chennai (IN); Thamilchelvi Peterbarnabas, Chennai (IN)

(73) Assignee: WIPRO LIMITED, Bangalore (IN)

( * ) Notice: Subject to any disclaimer, the term of this patent is extended or adjusted under 35 U.S.C. 154(b) by 71 days.

(21) Appl. No.: 15/016,553

(22) Filed: Feb. 5, 2016

(65) Prior Publication Data

US 2017/0161180 A1 Jun. 8, 2017

(30) Foreign Application Priority Data

Dec. 3, 2015 (IN) .......................... 6489/CHE/2015

(51) Int. Cl.
*G06F 9/44* (2006.01)
*G06F 11/36* (2006.01)

(52) U.S. Cl.
CPC ................... *G06F 11/3684* (2013.01)

(58) Field of Classification Search
None
See application file for complete search history.

(56) References Cited

U.S. PATENT DOCUMENTS

| 8,479,171 B2 | 7/2013 | Ghosh |
| 8,819,642 B2 * | 8/2014 | Bhat .................. G06F 11/3676 717/124 |
| 2012/0030651 A1 | 2/2012 | Kemmler et al. |
| 2017/0060734 A1 * | 3/2017 | Raz ..................... G06F 11/3692 |

* cited by examiner

*Primary Examiner* — Qamrun Nahar
(74) *Attorney, Agent, or Firm* — Finnegan, Henderson, Farabow, Garrett & Dunner, LLP (57) ABSTRACT

The present disclosure relates to a method for optimizing test suite comprising plurality of test cases. The method comprises receiving, a test suite comprising a plurality of test cases along with one or more optimization parameters from one or more sources. The method further comprises computing similarity index scores of each test case by comparing test case scenario of each test case of the plurality of test cases with a first reference test case scenario. The method further comprises identifying first set of one or more test cases among the plurality of test cases requiring optimization when the similarity index scores of the one or more test cases is equal to or more than a predetermined threshold score. The method further comprises performing one or more events on the identified first set of one or more test cases for optimizing the test suite.

19 Claims, 5 Drawing Sheets

SYSTEM AND METHOD FOR OPTIMIZING TEST SUITE COMPRISING PLURALITY OF TEST CASES

TECHNICAL FIELD

The present subject matter is related, in general to software testing, and more particularly, but not exclusively to a test suite optimization system and a method for optimizing test suite comprising a plurality of test cases.

BACKGROUND

In software engineering and development, software testing is carried out on software applications and/or software systems or one of its features. Usually, a test suite is used to test the software applications and/or the software systems or one of its features. Typically, the test suite contains test cases that are a set of conditions under which a tester determines whether the one or more software applications and/or the software systems or one of its features is working as it was originally designed for it perform/function. Each of the test cases has a set of test data, preconditions, expected results and postconditions, developed for a particular test scenario in order to verify compliance against a specific requirement. It is important to use an accurate test suite along with corresponding test cases having the test scenario for testing corresponding software application and/or software systems or one of its features. In a situation, one or more test cases of a test suite may be used for testing a software application and/or software systems or one of its features. Considering a situation, where the one or more test cases may contain similar test scenario i.e. similar steps or paths of testing for the corresponding software program. Table 1 shows exemplary test suite comprising three test cases having identifications as TC_1, TC_2 and TC_3 which are used for testing a software application and/or software systems or one of its features.

TABLE 1

| Test Case (TC) Identification (ID) | Test Scenario |
| --- | --- |
| TC_1 | Start→Navigate to Payment page→Select Payment Method→Pay by Store Gift Card→Pay by Plastic Gift Card→Edit Card→Multi Card Payment?-->Enter Billing Address→Is Shipping Address Same as Billing Address?-->Enter Shipping Address→Click On Continue→Address Verification→ Review and Place Order→Payment Authorized?-->ReSelect Payment Method→End |
| TC_2 | Start→Navigate to Payment page→Select Payment Method→Pay by Credit/Debit card→Pay by Third Party Gift Card→RemoveCard→Multi Card Payment?-->Enter Billing Address→Is Shipping Address Same as Billing Address?-->Enter Shipping Address→Click On Continue→Address Verification→ Review and Place Order→Payment Authorized?-->End |
| TC_3 | Start→Navigate to Payment page→Select Payment Method→Pay by Credit/Debit card→Pay by Store Credit Card→Edit Card→Multi Card Payment?-->Enter Billing Address→Is Shipping Address Same as Billing Address?-->Enter Shipping Address→Click On Continue→Address Verification→ Review and Place Order→Payment Authorized?-->End |

All three test cases contain similar steps as highlighted in the illustrated table 1. In such a way, there is a level of redundancy built in the one or more test cases during testing for the software application and/or software systems or one of its features. Even though the one or more test cases contain the similar steps, the one or more test cases are executed separately for the testing which results in redundancy in the testing.

In one conventional method, black box testing is carried out for the testing. The black box testing involves testing the software application and/or software systems or one of its features without relying on the internal structure of the software application and/or software systems or one of its features. In the one conventional method, one or more test cases are used which comprise minimal paths or steps for the testing. However, such a way of testing does not solve the problem of testing using redundant test scenario of the one or more test cases.

In one conventional method, one or more test cases are prioritized based on user inputs or user requirements and then most accurate test case among the one or more test cases is selected for the testing. However, such a process is time consuming and requires multiple steps for determining the most suitable test case for particular testing process. Further, such a way does not solve the problem of testing using redundant test scenario of the one or more test cases.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one embodiment, the present disclosure relates to a method for optimizing test suite comprising plurality of test cases. The method comprises receiving, a test suite comprising a plurality of test cases along with one or more optimization parameters from one or more sources. The method further comprises computing similarity index scores of each test case by comparing test case scenario of each test case of the plurality of test cases with a first reference test case scenario. The method further comprises identifying first set of one or more test cases among the plurality of test cases requiring optimization when the similarity index scores of the one or more test cases is equal to or more than a predetermined threshold score. The method further comprises performing one or more events on the identified first set of one or more test cases for optimizing the test suite.

In another embodiment, the present disclosure relates to a test suite optimization system for optimizing test suite comprising plurality of test cases. The test suite optimization system further comprises a processor and a memory communicatively coupled to the processor, wherein the memory stores processor-executable instructions, which, on execution, cause the processor to perform operations to receive a test suite comprising a plurality of test cases along with one or more optimization parameters from one or more sources. The processor is further configured to compute similarity index scores of each test case by comparing test case scenario of each test case of the plurality of test cases with a first reference test case scenario. The processor is further configured to identify first set of one or more test cases among the plurality of test cases requiring optimization when the similarity index scores of the one or more test cases is equal to or more than a predetermined threshold score. The processor is further configured to perform one or more events on the identified first set of one or more test cases for optimizing the test suite.

In another embodiment, the present disclosure relates to a non-transitory computer readable medium including instructions stored thereon that when processed by at least one processor causes a test suite optimization system for optimizing test suite comprising plurality of test cases to perform the act of receiving a test suite comprising a plurality of test cases along with one or more optimization parameters from one or more sources. The medium further comprises computing similarity index scores of each test case by comparing test case scenario of each test case of the plurality of test cases with a first reference test case scenario. The medium further comprises identifying first set of one or more test cases among the plurality of test cases requiring optimization when the similarity index scores of the one or more test cases is equal to or more than a predetermined threshold score. The medium further comprises performing one or more events on the identified first set of one or more test cases for optimizing the test suite.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a test suite optimization system for optimizing test suite for testing the software application and/or software systems or one of its features. Particularly, embodiments of the present disclosure intend to remove redundancies of paths or steps contained in test scenario of one or more test cases. In such a way, a software application and/or software systems or one of its features is tested using a test suite with unique test scenarios of the one or more test cases i.e. with unique test scenarios of the corresponding one or more test cases. In such a way, time required for testing and complexity in using the test suite with its one or more test cases is reduced. In an embodiment, such redundancies of the test scenario in the corresponding one or more test cases is optimized based on similarity index between each of the one or more test cases which are involved in testing of the software application and/or software systems or one of its features. More particularly, a test suite having a plurality of test cases is received from a user along with optimization parameters. The optimization parameters include, without limitation, path similarity index between each of the one or more test cases that is set by default, criticality factor associated with each test case and requirement factor related to requirement of each test case. Based on the optimization parameters, similarity index score of each test case is calculated. The similarity index score of each test case is calculated by comparing a test scenario of each test case with a test scenario of a reference test case having number of components of the test scenario is highest among all the plurality of test cases. Based on the calculation, set of one or more test case whose similarity index score is equal to or more than a threshold score are identified to be requiring optimization. On the identified set of the one or more test case, one or more events such as one or more test cases are eliminated from usage for the testing, creation of a separate test suite and/or modification of the one or more test cases are performed in order to use unique test cases for optimizing the test suite suitable for carrying out the testing of the software application and/or software systems or one of its features. In an embodiment, one or more test cases which do not require optimization are grouped together. Then, among such one or more test cases, a second reference test case is identified whose number of components is highest among the one or more test cases. Test scenario of each such test case is compared with a test scenario of the second reference test cases to calculate similarity index score. Like above, second set of test cases are identified to be requiring optimization when similarity index score is equal to or more than a threshold score. This process of identifying a reference test case, calculating the similarity index score and identifying of sets of test cases requiring the optimization is repeated until no test case is found from the second set of one or more test cases which do not require the optimization and whose similarity index score satisfies the predetermined threshold score.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
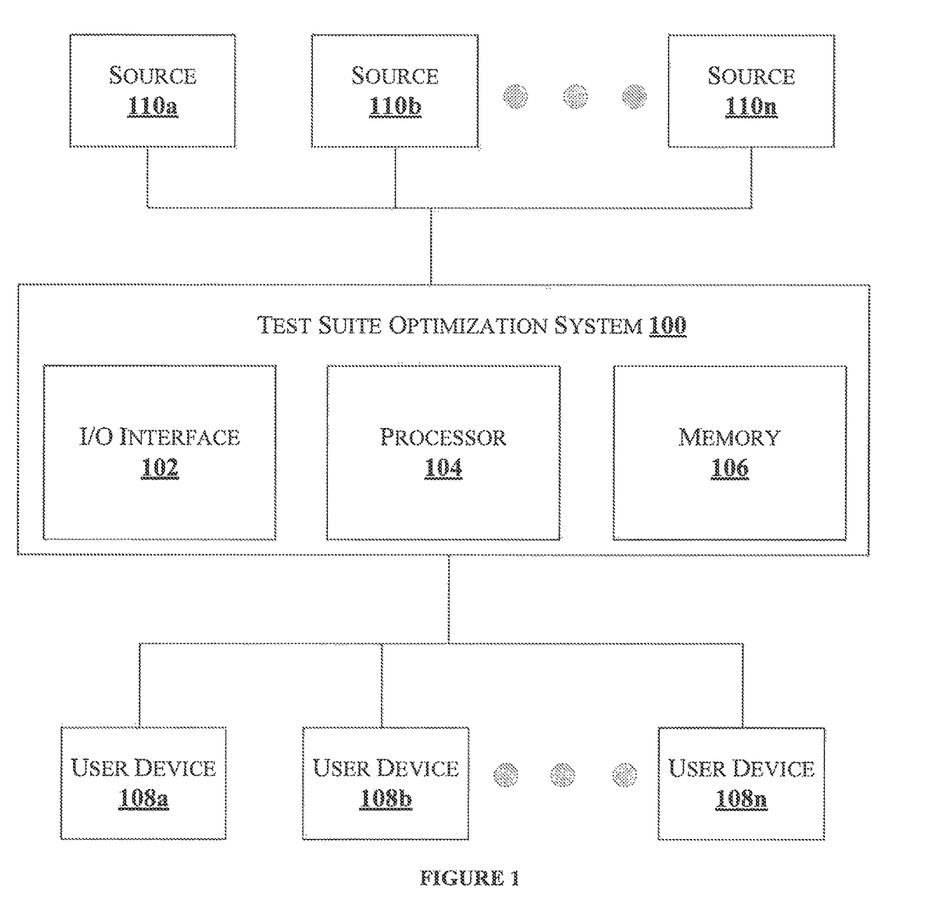
FIG. 1 illustrates an exemplary environment having a test suite optimization system and other components in accordance with some embodiments of the present disclosure.

FIG. 2 illustrates an exemplary embodiment of environment for optimizing test suite comprising plurality of test cases for testing the software application and/or software systems or one of its features in accordance with some embodiments of the present disclosure.

The environment comprises a test suite optimization system 100, one or more user devices 108a, 108b, . . . , 108n (collectively referred to 108) and one or more sources 110a, 110b, . . . , 110n (collectively referred to 110). In one implementation, the test suite optimization system 100 may be implemented in a variety of computing systems, such as a laptop computer, a desktop computer, a Personal Computer (PC), a notebook, a smartphone, a tablet, e-book readers (e.g., Kindles and Nooks), a node in a network, a server, a network server, and the like. In one example, the test suite optimization system 100 is configured to optimize a test suite comprising a plurality of test cases required for testing the software application and/or software systems or one of its features. In an embodiment, the test suite optimization system 100 functions both in online and offline mode. The components of the test suite optimization system 100 are explained in detail below sections of the description.

In an embodiment, the test suite optimization system 100 is communicatively connected to the one or more user devices 108 and the one or more sources 110 over a network (not shown in FIG. 1).

The one or more user devices 108 are associated to the one or more users involved in the software application and/or software systems or one of its features testing. In an embodiment, the one or more users include, without limitations, Business Analysts (BA), a tester, etc. who are involved in testing the software application and/or software systems or one of its features. The one or more user devices 108 include, but are not limited to, computing systems, such as a laptop computer, a desktop computer, a Personal Computer (PC), a notebook, a smartphone, a tablet. In an embodiment, for testing, one or more test suites are used where each test suite may comprises a plurality of test cases. Each test suite is used to test the one or more software application and/or software systems or one of its features along with the numerous software applications and/or the software modules. Each test case includes a set of conditions under which the one or more users determines whether the one or more software application and/or software systems or one of its features are working as designed. Each test case contains a test scenario that includes a number of steps for carrying out testing for corresponding software application and/or software systems or one of its features. Exemplary test cases having the test scenario is shown in table 1. The one or more user devices 108 may input the test suite along with the plurality of test cases having the test scenario. The inputs containing the test suite along with the plurality of test cases having the test scenario is received by the test suite optimization system 100 based on which the test suite is optimized for testing the software application and/or software systems or one of its features. Further, in an embodiment, the one or more user devices 108 are used to input one or more optimization parameters. Furthermore, the one or more user devices 108 are used to input risk parameters, a predetermined threshold score set by the one or more user for optimization and other such parameters related to the optimization of the test suite in usage. In an embodiment, the one or more user devices 108 may act as the test suite optimization system 100. In such a case, the one or more user devices 108 can optimize the test suite having the plurality of test cases.

The one or more sources 110 refer to, without limitations, process models related to testing for example Architecture of Integrated Information Systems (ARIS) models, business processes related to the testing, etc. In an embodiment, the one or more user devices 108 may act as the one or more sources 110 providing the test suite having the plurality of test cases along with the one or more optimization parameters, the risk parameters, the predetermined threshold score and the other such parameters.

In the illustrated FIG. 1, the test suite optimization system 100 comprises an I/O interface 102, a central processing unit ("CPU" or "processor") 104 having one or more processing units, and a memory 106 in accordance with some embodiments of the present disclosure.

The I/O interface 102 is a medium through which the test suite comprising the plurality of test cases along with the one or more optimization parameters, the risk parameters, the predetermined threshold score and the other such parameters are received from the one or more user devices 108 and/or the one or more sources 110. In an embodiment, the I/O interface 102 is used as the medium through which result of optimization of the test suite is provided to a display unit (not shown) of the test suite optimization system 100 and/or to a display device associated to the one or more user devices 108 and/or the one or more sources 110. The I/O interface 102 is coupled with the processor 104. The processor 104 is configured to optimize the test suite having the plurality of test cases for testing the software application and/or software systems or one of its features.

The processor 104 may comprise at least one data processor for executing program components for processing system-generated test suite comprising the plurality of test cases. The processor 104 is configured to compute similarity index of each test case. In an embodiment, the processor 104 computes the similarity index scores of each test case by comparing test scenario of each test case with a first reference test case scenario. The processor 104 selects the test case scenario of one of the plurality of test cases as the first reference test case scenario if one of the plurality of test cases comprises highest number of components than other test cases of the plurality of test cases. The number of components of each test case is identified and the plurality of test cases is ordered based on the number of components by the processor 104. The processor 104 identifies first set of one or more test cases among the plurality of test cases requiring optimization when the similarity index scores of the one or more test cases is equal to or more than a predetermined threshold score. In an embodiment, the criticality parameters and the requirement coverage parameters are applied on the identified first set of one or more test cases. The processor 104 performs one or more events on the identified first set of the one or more test cases for optimizing corresponding test suite. The processor 104 groups one or more test cases that do not require optimization. The processor 104 repeats identification of second reference test case scenario, computation of similarity index scores using the comparison between the test case scenario and the second reference test case scenario, identification of subsequent set of one or more test cases requiring the optimization based on the predetermined threshold score, and performing the one or more events on such sets of the one or more test cases for optimizing the corresponding test suite. The processor 104 continuously repeats such process until no test case from the one or more test cases not requiring optimization that satisfies the predetermined threshold score is found. In an embodiment, the processor 104 applies the one or more optimization parameters like criticality parameters and requirement coverage parameters on the identified the first and the second sets of one or more test cases before optimizing the one or more test cases by performing the one or more events. Various functionalities performed by the processor 104 are achieved using one or more modules that are stored in the memory 106 which are explained in below description.

The memory 106 stores instructions which are executable by the at least one processor 104. In an embodiment, the memory 106 stores test case details, optimization parameters, reference test case information, iteration details, similarity index score details, and predetermined threshold score. In an embodiment, the test case details, the optimization parameters, the reference test case information, the iteration details, the similarity index score details, and the predetermined threshold score are stored as one or more data required for optimizing the test suite having the plurality of test cases for testing the software application and/or software systems or one of its features as described in the following description of the disclosure.

Figure 2:
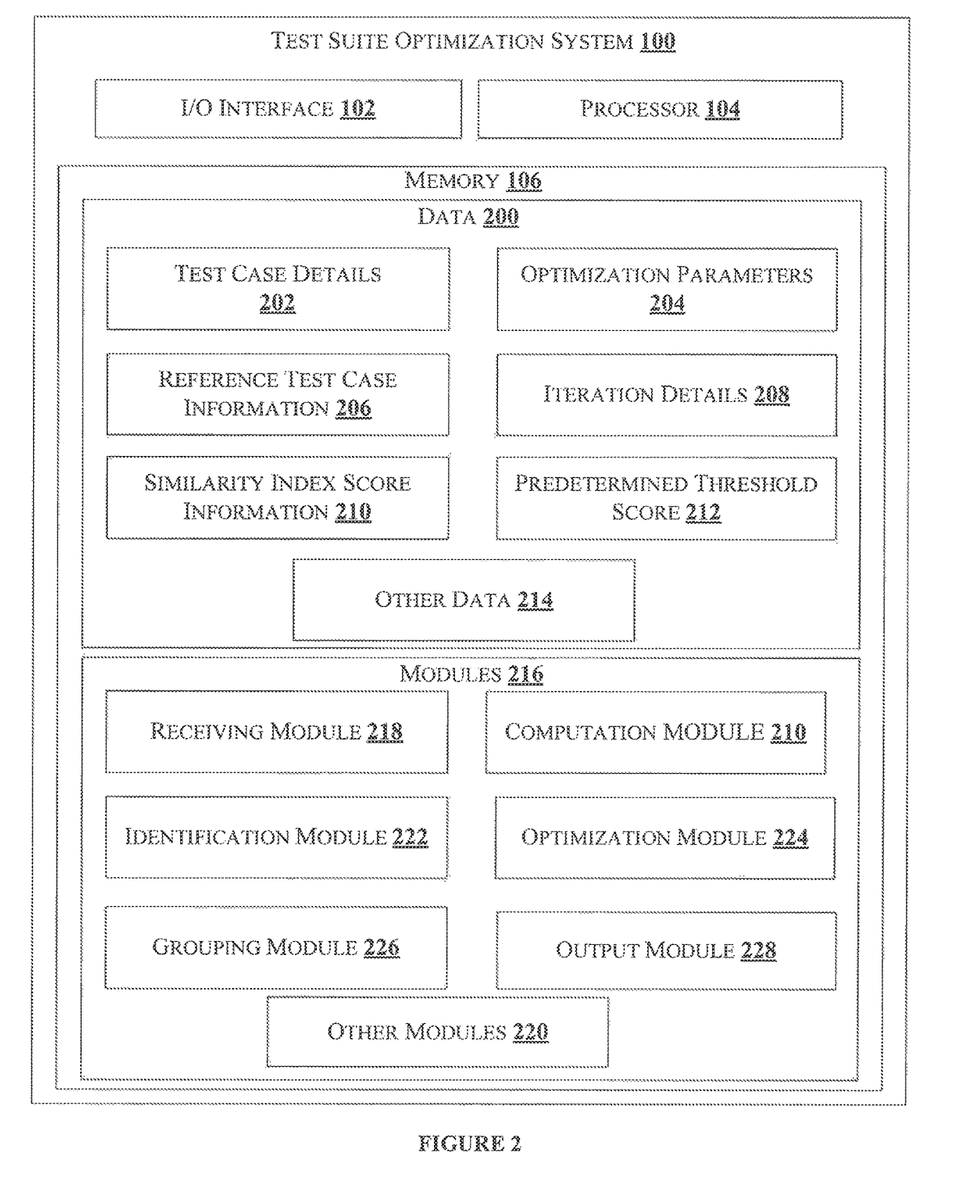
FIG. 2 illustrates a block diagram of the exemplary test suite optimization system with various data and modules for optimizing test suite comprising plurality of test cases in accordance with some embodiments of the present disclosure.

FIG. 2 illustrates a block diagram of the exemplary test suite optimization system 100 with various data and modules for optimizing the test suite comprising the plurality of test cases in accordance with some embodiments of the present disclosure. In the illustrated FIG. 2, the one or more data 200 and the one or more modules 216 stored in the memory 106 are described herein in detail.

In an embodiment, the one or more data 200 may include, for example, the test case details 202, the optimization parameters 204, the reference test case information 206, the iteration details 208, the similarity index score details 210, and the predetermined threshold score 212 and other data 214 for optimizing the test suite comprising the plurality of test cases.

The test case details 202 include details of a test suite in usage for testing. The details of the test suite include, without limitations, details of each of the plurality of test cases of the test suite. The details of each of the plurality of test cases contain kinds of test cases, the test scenario of each test case etc. In an embodiment, numbers of components i.e. test case components which are test steps or path contained in the test scenario of each test case used for testing is also included in the details of each test case. Table 2 shows exemplary test cases containing number of components in each test case.

TABLE 2

| Test Case ID | Test Scenario | Number of Components |
|---|---|---|
| TC_1 | Start→Navigate to Payment page→Select Payment Method→Pay by Store Gift Card→Pay by Plastic Gift Card→Edit Card→Multi Card Payment?-->Enter Billing Address→Is Shipping Address Same as Billing Address?-->Enter Shipping Address→Click On Continue→Address Verification→ Review and Place Order→Payment Authorized?-->ReSelect Payment Method→End | 15 |
| TC_2 | Start→Navigate to Payment page→Select Payment Method→Pay by Credit/Debit card→Pay by Third Party Gift Card→Remove Card→Multi Card Payment?-->Enter Billing Address→Is Shipping Address Same as Billing Address?-->Enter Shipping Address→Click On Continue→Address Verification→ Review and Place Order→Payment Authorized?-->End | 14 |
| TC_3 | Start→Navigate to Payment page→Select Payment Method→Pay by Credit/Debit card→Pay by Store Credit Card→Edit Card→Multi Card Payment?-->Enter Billing Address→Is Shipping Address Same as Billing Address?-->Enter Shipping Address→Click On Continue→Address Verification→ Review and Place Order→Payment Authorized?-->End | 14 |

The path or steps contained in the test scenario of TC_1 is 15, in test scenario of TC_2 is 14 and in test scenario of TC_3 is 14. The test case details 202 of each test case are retrieved from the plurality of test cases received from the one or more user devices 108 and/or the one or more sources 110.

The optimization parameters 204 include such parameters which are used for optimizing the test suite. The optimization parameters include, but are not limited to, similarity parameters, criticality parameters and requirement coverage parameters. In an embodiment, the similarity parameters are set by default by the one or more users based on the test suite in usage for testing. The similarity parameters contain score that depicts the likeness of the test case scenario of each test case with at least one reference test case scenario. The criticality parameters are related to criticality of the test scenario of corresponding test case in the test suite. The requirement coverage parameters are related to requirement of the test case scenario of each test case in the test suite for testing. The optimization parameters 204 also include, without limitations, risk parameters which relate to risks associated with the test scenario of each test case. In an embodiment, the risk parameters are used as the predetermined threshold score for identifying the one or more test cases requiring the optimization in any iteration.

The reference test case information 206 contains such test case scenarios which are selected as reference test case scenario of such test cases which contains their corresponding number of components being the highest comparatively to number of components of other test cases of the plurality of test cases.

The iteration details 208 contain number of iterations performed for identifying reference test case scenarios in each iteration, computation of similarity index scores using the comparison between the test case scenario and the reference test case scenarios in the corresponding iteration, identification of set of one or more test cases requiring the optimization based on the predetermined threshold score, and performing the one or more events on such sets of the one or more test cases for optimizing the corresponding test suite. The iteration details 208 includes such iteration where the process is repeated until no test case from the one or more test cases not requiring optimization that satisfies the predetermined threshold score is found. Further, the iteration details 208 include number of times the iterations are performed.

The similarity index score information 210 contains the similarity index scores of each test case of the plurality of test cases based on the comparison between the corresponding test case scenario with the at least one reference test case scenario. The similarity index score of each test case calculated from each iteration based on the one or more optimization parameters and different reference test case scenario is stored.

The predetermined threshold score 212 is the set threshold score required for identifying such test cases whose similarity index score is equal to or more than the set threshold score. The predetermined threshold score may be received from the one or more users and/or set by default. For example, the predetermined threshold score may 75%.

The other data 214 may refer to such data which can be referred for optimizing the test suite comprising the plurality of test cases for testing the software application and/or software systems or one of its features.

In an embodiment, the one or more data 200 in the memory 106 are processed by the one or more modules 216 of the test suite optimization system 100. The one or more modules 216 may be stored within the memory 106 as shown in FIG. 2. In an example, the one or more modules 216, communicatively coupled to the processor 104, may also be present outside the memory 106 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 216 may include, for example, a receiving module 218, a computation module 220, an identification module 222, an optimization module 224, a grouping module 226 and an output module 228. The memory 106 may also comprise other modules 230 to perform various miscellaneous functionalities of the test suite optimization system 100. It will be appreciated that such aforementioned modules may be represented as a single module or a combination of different modules.

The receiving module 218 receives the test suite comprising the plurality of test cases from the one or more sources 110. In an embodiment, the receiving module 218 receives the one or more optimization parameters such as the similarity parameters, the criticality parameters and the requirement coverage parameters, the risk parameters and the predetermined threshold score along with the test suite comprising the plurality of test cases.

The computation module 220 identifies the number of components of each test case from the test scenario of the corresponding test case. Table 3 shows exemplary test cases having certain number of components identified from the corresponding test scenario.

TABLE 3

| Test Case ID | Test Scenario | Number of Components |
|---|---|---|
| TC_1 | Start-->Navigate to Payment page-->Select Payment Method-->Pay by Store Gift Card-->Pay by Plastic Gift Card-->Edit Card-->Multi Card Payment?-->Enter Billing Address-->Is Shipping | 15 |

TABLE 3-continued

| Test Case ID | Test Scenario | Number of Components |
|---|---|---|
| | Address Same as Billing Address?-->Enter Shipping Address-->Click On Continue-->Address Verification--> Review and Place Order-->Payment Authorized?-->ReSelect Payment Method-->End | |
| TC_2 | Start-->Navigate to Payment page-->Select Payment Method-->Pay by Credit/Debit card-->Pay by Third Party Gift Card-->Remove Card-->Multi Card Payment?-->Enter Billing Address-->Is Shipping Address Same as Billing Address?-->Enter Shipping Address-->Click On Continue-->Address Verification--> Review and Place Order-->Payment Authorized?-->End | 14 |
| TC_3 | Start-->Navigate to Payment page-->Select Payment Method-->Pay by Credit/Debit card-->Pay by Store Credit Card-->Edit Card-->Multi Card Payment?-->Enter Billing Address-->Is Shipping Address Same as Billing Address?-->Enter Shipping Address-->Click On Continue-->Address Verification--> Review and Place Order-->Payment Authorized?-->End | 14 |
| TC_4 | Start-->Navigate to Payment page-->Select Payment Method-->Pay by Credit/Debit card-->Pay by Store Credit Card-->Remove Card-->Multi Card Payment?-->Enter Billing Address-->Is Shipping Address Same as Billing Address?-->Enter Shipping Address-->Click On Continue-->Address Verification-->ReEnter Billing Address-->End | 13 |
| TC_5 | Start-->Navigate to Payment page-->Select Payment Method-->Pay by Store Gift Card-->Pay by Plastic Gift Card-->Edit Card-->Multi Card Payment?-->Enter Billing Address-->Is Shipping Address Same as Billing Address?-->Enter Shipping Address-->Click On Continue-->Address Verification-->ReEnter Billing Address-->End | 13 |
| TC_6 | Start-->Navigate to Payment page-->Select Payment Method-->Pay by Store Gift Card-->Pay by Plastic Gift Card-->Add Card-->Multi Card Payment?-->Enter Billing Address-->Is Shipping Address Same as Billing Address?-->Select CheckBox for Billing Address same as Shipping Address-->Address Verification-->ReEnter Billing Address-->End | 12 |
| TC_7 | Start-->Navigate to Payment page-->Select Payment Method-->Pay by Store Gift Card-->Pay by Plastic Gift Card-->Add Card-->Multi Card Payment?-->PayByAnotherCard-->End | 8 |

In an embodiment, the plurality of test cases is ordered based on the number of the components. For example, the plurality of test cases is sorted in descending order of steps or path contained in the test case scenario as shown in table 3. Upon ordering the plurality of test cases, from the identified number of components, a first reference test case scenario associated to a test case is chosen among the plurality of test cases where the test case has highest number of components than the other test cases of the plurality of test cases. For example, test case scenario of the test case TC_1 is chosen as the reference test case scenario. The computation module 220 computes the similarity index scores of each test case by comparing the test case scenario of each test case of the plurality of test cases with the first reference test case scenario. Table 4 shows the similarity index scores of each test case being compared with the first reference test case scenario:

TABLE 4

| TC ID | Number of Components | Number of Similar components | Similarity Index Score (in %) |
|---|---|---|---|
| TC_1 | 15 | First Reference Test case Scenario | — |
| TC_2 | 14 | 12 | 80 |
| TC_3 | 14 | 13 | 87 |
| TC_4 | 13 | 10 | 67 |
| TC_5 | 13 | 13 | 87 |
| TC_6 | 12 | 10 | 67 |
| TC_7 | 8 | 7 | 47 |

The table 4 above shows the similarity index scores of each test case. The similarity index scores is not computed for the test case TC_1 being the first reference test case scenario.

The identification module 222 identifies first set of one or more test cases among the plurality of test cases requiring optimization when the similarity index scores of each of the first set of the one or more test cases is equal to or more than the predetermined threshold score. For example, consider the predetermined threshold score is 75%. Table 5 below shows the exemplary test cases which require the optimization when the similarity index score is equal to or more than the predetermined threshold score. The test cases requiring the optimization are marked with "Yes" and the test cases which do not require the optimization are marked as "No" as shown in below table 5:

TABLE 5

| TC ID | Number of Components | Number of Similar components | Similarity Index Score | Marked for Optimization |
|---|---|---|---|---|
| TC_1 | 15 | Reference Scenario | — | — |
| TC_2 | 14 | 12 | 80 | Yes |
| TC_3 | 14 | 13 | 87 | Yes |
| TC_4 | 13 | 10 | 67 | No |
| TC_5 | 13 | 13 | 87 | Yes |
| TC_6 | 12 | 10 | 67 | No |
| TC_7 | 8 | 7 | 47 | No |

In an embodiment, the criticality parameters and the requirement coverage parameters are applied on the one or more test cases which require the optimization. In a situation where the test case scenario of the one or more test cases is marked critical and/or having critical components, then the critical test case scenario is retained. In a situation where the test case scenario of the one or more test cases is marked for requirement, then the test case scenario is retained. In an embodiment, the one or more test cases requiring the optimization are grouped together and the one or more test cases not requiring the optimization are grouped together by the grouping module 226. Table 6 shows the group having the one or more test cases requiring the optimization and table 7 shows the group having the one or more test cases not requiring the optimization respectively.

TABLE 6

| TC ID | Similarity Index Score | Marked for Optimization |
|---|---|---|
| TC_2 | 80 | Yes |
| TC_3 | 87 | Yes |
| TC_5 | 87 | Yes |

TABLE 7

| TC ID | Similarity Index Score | Marked for Optimization |
|---|---|---|
| TC_4 | 67 | No |
| TC_6 | 67 | No |
| TC_7 | 47 | No |

From table 6, test cases TC_2, TC_3 and TC_5 are found to be requiring the optimization. In an embodiment, the optimization module 224 performs one or more events on the identified first set of the one or more test cases for optimizing the test suite. The one or more events include, but are not limited to, further optimization to identify unique test case scenarios and/or to identify more redundant test case scenarios, eliminating the test scenario of such redundant test case scenarios, determining uniqueness of one or more steps or paths in the test scenario of the corresponding test case, generating a different test scenario to remove the redundancy of other test scenarios of the other test cases, etc. In an embodiment, the criticality parameters and the requirement coverage parameters are applied on the identified first set of one or more test cases before optimizing the one or more test cases by performing the one or more events by the optimization module 224. The result of optimization of the test suite is provided to the one or more user by the output module 228.

In an embodiment, the steps of identifying a reference test case, computing the similarity index score and identifying of sets of test cases requiring the optimization is repeated until no test case is found from the set of one or more test cases which do not require the optimization and whose similarity index score does not satisfies the predetermined threshold score. Such repetition is performed using resilient based approach in order fetch out the unique test cases with no redundancies in the test case scenario of such test cases. Particularly, the computation module 220 computes similarity index scores of each test case of the one or more test cases that do not require optimization by comparing the test case scenario of each test case of one or more test cases not requiring optimization with a second reference test case. The identification module 222 identifies a second set of one or more test cases requiring optimization among the one or more test cases which do not require the optimization when the similarity index scores of the one or more test cases is equal to or more than the predetermined threshold score. The optimization module 224 performs the one or more events on the identified second set of one or more test cases for optimizing the test suite. For example, from table 7, test cases TC-4, TC_6 and TC_7 are found to be not requiring the optimization. These test cases are subjected to another iteration using the resilience based approach. In the second iteration, the second reference test case scenario is TC_4 that comprises highest number of components in the test scenario. In such a way, TC_6 found to be requiring the optimization by computing the similarity index score as show in below table 8:

TABLE 8

| TC ID | Number of Components | Number of similar components | Similarity Index Score | Marked for Optimization |
|---|---|---|---|---|
| TC_4 | 13 | Reference Scenarios | | |
| TC_6 | 12 | 9 | 90 | Yes |
| TC_7 | 8 | 5 | 50 | No |

In an embodiment, the resilience based iterations is repeated until there are no more test case scenarios identified for optimization. In the above example as shown in Table 8, though there is a test case scenario TC_7 found for optimization and which is unique test case scenario. However there are no more test case scenarios left for analysis, thus such iteration is a final iteration. The result of such iterations and optimization is provided to the one or more users by the output module 228.

In an embodiment, number of test case scenario chosen as reference test case scenarios and total number of test cases being optimized are listed as shown below tables 9 and 10:

TABLE 9

| TC Name | Remarks |
| --- | --- |
| TC_1 | Reference test case scenario of first iteration |
| TC_4 | Reference test case scenario of second iteration |
| TC_7 | Unique test case scenario identified (similarity index less than 75% when compared to reference |

TABLE 10

| TC Name | Similarity Index | Marked for Optimization |
| --- | --- | --- |
| TC_2 | 80 | Yes |
| TC_3 | 87 | Yes |
| TC_5 | 87 | Yes |
| TC_6 | 90 | Yes |

Figure 3:
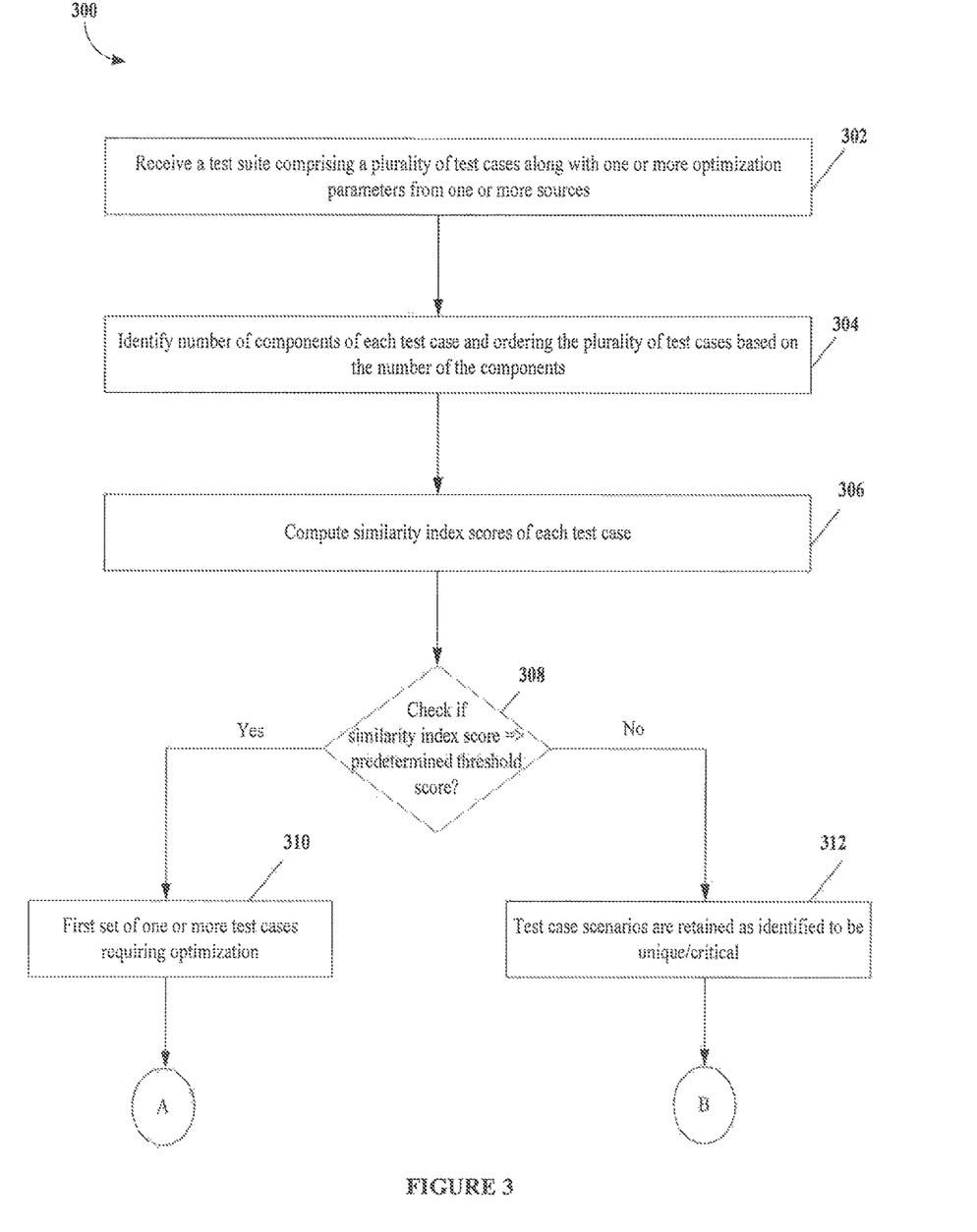
FIG. 3 shows a flowchart illustrating a method for optimizing test suite comprising plurality of test cases in accordance with some embodiments of the present disclosure.

FIG. 3 shows a flowchart illustrating a method 300 for optimizing test suite comprising the plurality of test case for testing the software application and/or software systems or one of its features in accordance with some embodiments of the present disclosure.

As illustrated in FIG. 3, the method comprises one or more blocks for optimizing test suite comprising the plurality of test case for testing the software application and/or software systems or one of its features. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method 300 can be implemented in any suitable hardware, software, firmware, or combination thereof.

At block 302, the test suite comprising the plurality of test cases along with the one or more optimization parameters and the risk parameters and the predetermined threshold score from the one or more sources 110. In an embodiment, the one or more optimization parameters include, without limitations, the similarity parameters, the criticality parameters and the requirement coverage parameters.

At block 304, the number of components of each test case is identified and the plurality of test cases is ordered based on the number of the components. In an embodiment, the first reference test case scenario associated to the test case of the plurality of test cases is chosen having highest number of components than other test cases of the plurality of test cases.

At block 306, the similarity index score of test case is computed with respect to the first reference test case scenario. In particular, the test case scenario of each test case of the plurality of test cases is compared with the first reference test case scenario.

At block 308, a condition is checked whether the similarity index scores of the other test cases is equal to or more than the predetermined threshold score. If the similarity index scores of the other test cases is equal to or more than the predetermined threshold score, the process goes to block 310 via "Yes" where first set of the one or more test cases are identified that require the optimization. The process from block 310 goes to block 'A'. If the similarity index scores of the other test cases is not either equal to or more than the predetermined threshold score, the process goes to block 312 via "No" where the test case scenarios are retained to be unique/critical. Then, the process goes to block 'B'.

At block A, i.e. at block 314, a condition is checked whether the criticality parameters are chosen for further optimization. If the criticality parameters are chosen for further optimization, then the process goes to block 316 via "Yes" where a condition is checked whether the test case scenario is critical. If the test case scenario is critical, then the process goes to block 'B'. At block B leading to block 318 checks whether there are more test case scenarios left for the optimization. If there are more test case scenarios left for the optimization, the process goes back to block 306 via "Yes". If there are no more test case scenarios left for the optimization, then the process ends at block 320.

If at block 314, if the criticality parameters are not chosen for further optimization, then the process goes to block 322 via "No" where a condition is checked whether the requirement coverage parameters are chosen for further optimization. If the requirement coverage parameters are chosen for further optimization, the process goes to block 324 via "Yes" where a condition is checked whether the test case scenario uniquely maps to the requirement. If the test case scenario uniquely maps to the requirement, then the process goes to block B. If no test case scenario uniquely maps to the requirement, then the process goes to block 326 where the one or more events are performed for optimization of the test suite. In an embodiment, the process of identifying the similarity index score is repeated until no test case from the one or more test cases not requiring optimization that satisfies the predetermined threshold score is found. Particularly, the similarity index scores of each test case of the one or more test cases not requiring optimization by comparing the test case scenario of each test case of one or more test cases not requiring optimization with the second reference test case. Then, the second set of one or more test cases among the one or more test cases requiring optimization when the similarity index scores of the one or more test cases is equal to or more than a predetermined threshold score. The second reference test case scenario is a test case scenario associated to a test case of the one or more test cases not requiring the optimization having highest number of components than other test cases of the one or more test cases not requiring the optimization. Then, the one or more events are performed on the identified second set of one or more test cases for optimizing the test suite.

Computer System

Figure 4:
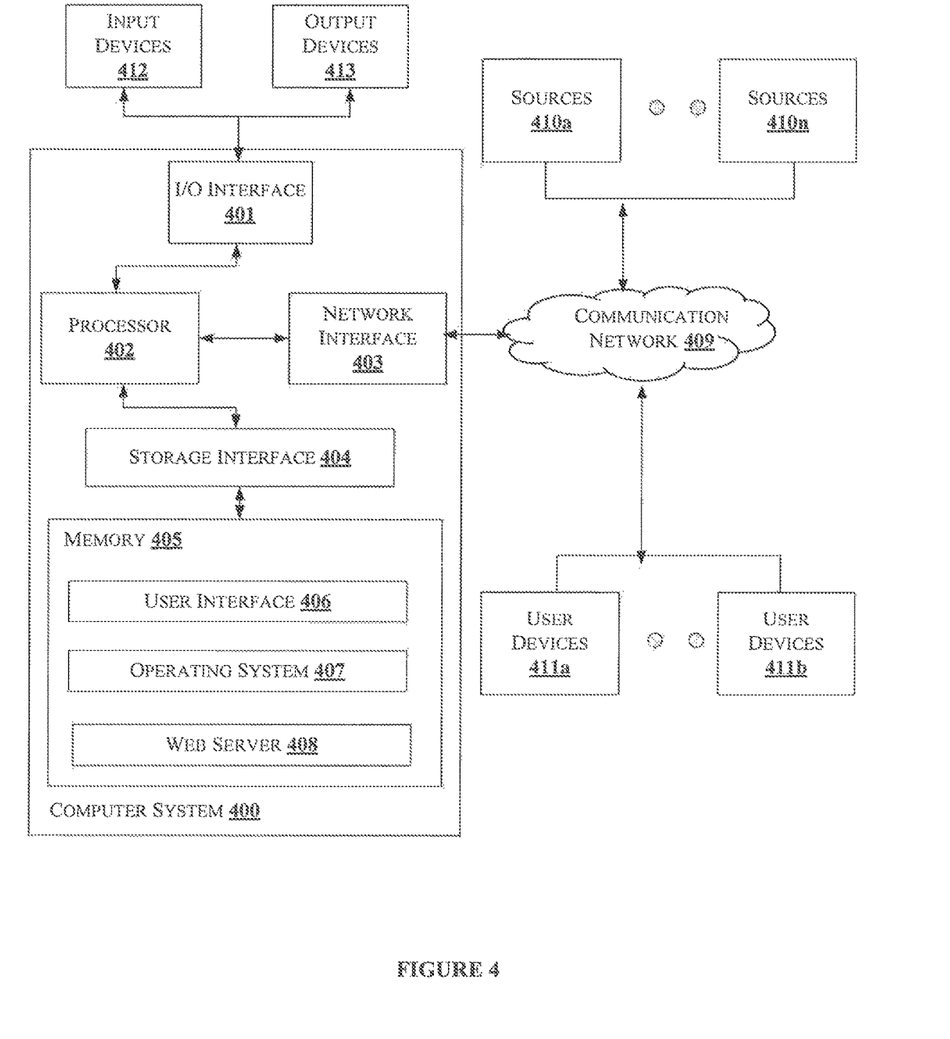
FIG. 4 is a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the test suite optimization system 100. The computer system 400 may comprise a central processing unit ("CPU" or "processor") 402. The processor 402 may comprise at least one data processor for executing program components for executing system-generated test suite and test cases for testing the software application and/or software systems or one of its features. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 is connected to the one or more user devices 411a, . . . , 411n, and the one or more sources 410a, . . . , 410n through a communication network 409. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with the one or more user devices 411a, . . . , 411n, and the one or more servers 410a, . . . , 410n. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 404, web server 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 404 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 400 may implement a web browser 404 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure provide user flexibility to define different factors for optimization of the test suite.

Embodiments of the present disclosure provide an approach that can be applied across any test management tool that has feature of test component definition.

Embodiments of the present disclosure provide model based approach for test case generation using any business process modeling tools.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
| --- | --- |
| Reference Number | Description |
| 100 | Test Suite Optimization System |
| 102 | I/O Interface |
| 104 | Processor |
| 106 | Memory |

-continued

Referral Numerals:

| Reference Number | Description |
|---|---|
| 108a, ..., 108n | User Devices |
| 110a, ..., 110n | Sources |
| 200 | Data |
| 202 | Test Case Details |
| 204 | Optimization Parameters |
| 206 | Reference Test Case Information |
| 208 | Iteration Details |
| 210 | Similarity Index Score Information |
| 212 | Predetermined Threshold Score |
| 214 | Other Data |
| 216 | Modules |
| 218 | Receiving Module |
| 220 | Computation Module |
| 222 | Identification Module |
| 224 | Optimization Module |
| 226 | Grouping Module |
| 228 | Output Module |
| 230 | Other Modules |
| 400 | Computer System |
| 401 | I/O Interface |
| 402 | Processor |
| 403 | Network Interface |
| 404 | Storage Interface |
| 405 | Memory |
| 406 | User Interface |
| 404 | Operating System |
| 408 | Web Server |
| 409 | Communication Network |
| 410a, ..., 410n | Sources |
| 411a, ..., 411n | User Devices |
| 412 | Input Devices |
| 413 | Output Devices |

What is claimed is:

1. A method for optimizing test suite comprising plurality of test cases, the method comprising:
   receiving, by a test suite optimization system, a test suite comprising a plurality of test cases along with one or more optimization parameters from one or more sources;
   computing, by the test suite optimization system, similarity index scores of each test case by comparing test case scenario of each test case of the plurality of test cases with a first reference test case scenario;
   identifying, by the test suite optimization system, first set of one or more test cases among the plurality of test cases requiring optimization when the similarity index scores of the one or more test cases is equal to or more than a predetermined threshold score; and
   performing, by the test suite optimization system, one or more events on the identified first set of one or more test cases for optimizing the test suite.

2. The method as claimed in claim 1 further comprising identifying number of components of each test case, wherein the plurality of test cases are ordered based on the number of the components.

3. The method as claimed in claim 1, wherein the first reference test case scenario is a test case scenario associated to a test case of the plurality of test cases having highest number of components than other test cases of the plurality of test cases.

4. The method as claimed in claim 1, wherein the one or more optimization parameters comprises at least one of similarity parameters, criticality parameters and requirement coverage parameters.

5. The method as claimed in claim 4 further comprising applying the criticality parameters and the requirement coverage parameters on the identified first set of one or more test cases before optimizing the one or more test cases by performing the one or more events.

6. The method as claimed in claim 5 further comprising grouping by the test suite optimization system, the one or more test cases not requiring the optimization.

7. The method as claimed in claim 6 further comprising computing, by the test suite optimization system, similarity index scores of each test case of the one or more test cases not requiring optimization by comparing the test case scenario of each test case of one or more test cases not requiring optimization with second reference test case;
   identifying, by the test suite optimization system, second set of one or more test cases among the one or more test cases requiring optimization when the similarity index scores of the one or more test cases is equal to or more than a predetermined threshold score; and
   performing, by the test suite optimization system, one or more event on the identified second set of one or more test cases for optimizing the test suite.

8. The method as claimed in claim 7, wherein method steps of claims 6 and 7 are repeated until no test case from the one or more test cases not requiring optimization satisfying the predetermined threshold score is found.

9. The method as claimed in claim 1, wherein the second reference test case scenario is a test case scenario associated to a test case of the one or more test cases not requiring the optimization having highest number of components than other test cases of the one or more test cases not requiring the optimization.

10. A test suite optimization system for optimizing test suite comprising plurality of test cases, comprising:
    a processor;
    a memory communicatively coupled to the processor, wherein the memory stores processor-executable instructions, which, on execution, cause the processor to:
      receive a test suite comprising a plurality of test cases along with one or more optimization parameters from one or more sources;
      compute similarity index scores of each test case by comparing test case scenario of each test case of the plurality of test cases with a first reference test case scenario;
      identify first set of one or more test cases among the plurality of test cases requiring optimization when the similarity index scores of the one or more test cases is equal to or more than a predetermined threshold score; and
      perform one or more events on the identified first set of one or more test cases for optimizing the test suite.

11. The test suite optimization system as claimed in claim 10, wherein the processor is further configured identify number of components of each test case, wherein the plurality of test cases are ordered based on the number of the components.

12. The test suite optimization system as claimed in claim 10, wherein the first reference test case scenario is a test case scenario associated to a test case of the plurality of test cases having highest number of components than other test cases of the plurality of test cases.

13. The test suite optimization system as claimed in claim 10, wherein the one or more optimization parameters comprises at least one of similarity parameters, criticality parameters and requirement coverage parameters.

14. The test suite optimization system as claimed in claim 13, wherein the processor is further configured to apply the criticality parameters and the requirement coverage parameters on the identified first set of one or more test cases before optimizing the one or more test cases by performing the one or more events.

15. The test suite optimization system as claimed in claim 14, wherein the processor is further configured to group the one or more test cases not requiring the optimization.

16. The test suite optimization system as claimed in claim 15, wherein the processor is further configured to:
   compute similarity index scores of each test case of the one or more test cases not requiring optimization by comparing the test case scenario of each test case of one or more test cases not requiring optimization with second reference test case;
   identify second set of one or more test cases among the one or more test cases requiring optimization when the similarity index scores of the one or more test cases is equal to or more than a predetermined threshold score; and
   perform one or more event on the identified second set of one or more test cases for optimizing the test suite.

17. The test suite optimization system as claimed in claim 16, wherein the processor is configured to repeat steps of claims 15 and 16 until no test case from the one or more test cases not requiring optimization satisfying the predetermined threshold score is found.

18. The test suite optimization system as claimed in claim 10, wherein the second reference test case scenario is a test case scenario associated to a test case of the one or more test cases not requiring the optimization having highest number of components than other test cases of the one or more test cases not requiring the optimization.

19. A non-transitory computer readable medium including instructions stored thereon that when processed by a processor cause a test suite optimization system for optimizing test suite comprising plurality of test cases to perform acts of:
   receiving a test suite comprising a plurality of test cases along with one or more optimization parameters from one or more sources;
   computing similarity index scores of each test case by comparing test case scenario of each test case of the plurality of test cases with a first reference test case scenario;
   identifying first set of one or more test cases among the plurality of test cases requiring optimization when the similarity index scores of the one or more test cases is equal to or more than a predetermined threshold score; and
   performing one or more events on the identified first set of one or more test cases for optimizing the test suite.

* * * * *

UNITED STATES PATENT AND TRADEMARK OFFICE
CERTIFICATE OF CORRECTION

PATENT NO. : 9,830,255 B2
APPLICATION NO. : 15/016553
DATED : November 28, 2017
INVENTOR(S) : Girish Raghavan et al.

Page 1 of 1

It is certified that error appears in the above-identified patent and that said Letters Patent is hereby corrected as shown below:

In the Claims

Claim 11, Column 20, Line 55, "further configured identify" should read -- further configured to identify --.

Signed and Sealed this
Thirty-first Day of July, 2018

Andrei Iancu
*Director of the United States Patent and Trademark Office*